United States Patent [19]
Richards

[11] 3,777,282
[45] Dec. 4, 1973

[54] METAL VAPOR LASER TUBE

[75] Inventor: William E. Richards, El Cajon, Calif.

[73] Assignee: The United States of America as represented by the Secretary of the Navy, Washington, D.C.

[22] Filed: Feb. 3, 1972

[21] Appl. No.: 223,201

[52] U.S. Cl............... 331/94.5, 313/219, 313/220, 313/227, 313/331
[51] Int. Cl........ H01s 3/02, H01s 3/22, H01j 61/26
[58] Field of Search................... 313/220, 227, 219, 313/331; 331/94.5

[56] References Cited
UNITED STATES PATENTS
2,162,505   6/1939   James et al. .................. 313/220

OTHER PUBLICATIONS
Kohl, Materials & Techniques for Electron Tubes, GT & B Tech. Series, Reinhold Pub. Co., 1960, pp. 18-23, & 394-396.

Primary Examiner—Ronald L. Wibert
Assistant Examiner—R. J. Webster
Attorney—R. S. Sciascia et al.

[57] ABSTRACT

A metal vapor laser tube is comprised of an enclosure preferably in an elongate tubular form containing an amount of a metallic element. The material of the enclosure is selected to be electrically non-conductive and also for its ability to withstand elevated temperatures. The enclosure also has at least one window capable of transmitting energy at the wavelength of emission of the metallic element contained within the enclosure. Two electrodes, preferably in the form of cylinders, are oppositely disposed within the enclosure and an electrical conductor is connected to each electrode for external connection to a source of electrical energy. An extension of the enclosure is provided proximate to each electrode for containing the respective electrical conductors within a hollow capillary portion of the extension and also including an end portion of the extension which is sealed around the terminal of the electrical conductor to render it pressure-tight. The tube may be fabricated of quartz and the end portions of the extensions may comprise glass sealed to the quartz of the extensions which include the hollow capillary portion and also sealed around the terminal of each respective electrical conductor.

6 Claims, 2 Drawing Figures

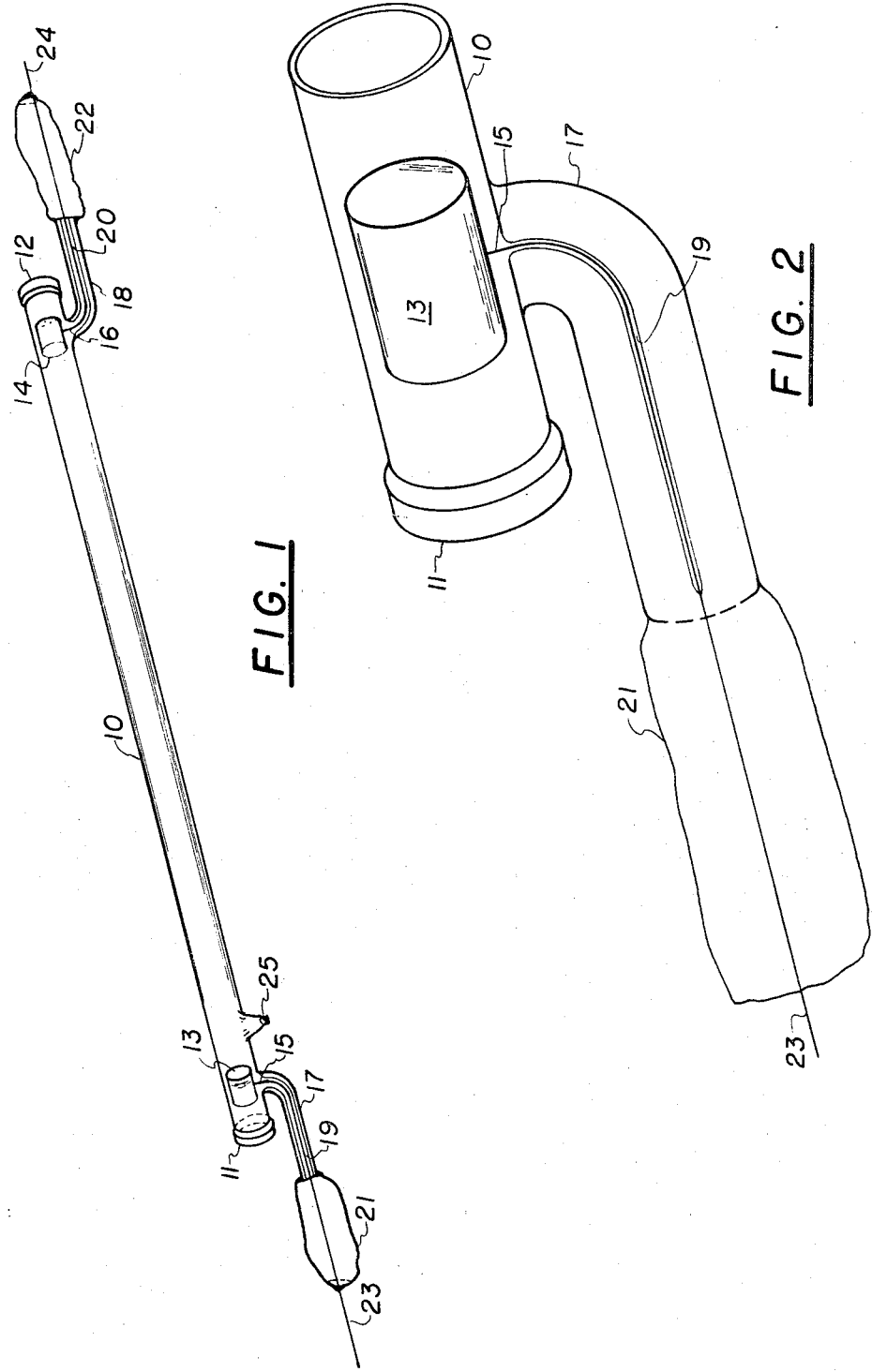

METAL VAPOR LASER TUBE

BACKGROUND OF THE INVENTION

Certain metallic vapor laser tubes preferably are maintained at elevated temperatures of the order of 900°C-1000°C for certain types of desired operation. Customarily, such laser tubes are enclosed within an oven to maintain the elevated temperature which causes the metallic element contained within the sealed enclosure of the laser tube to vaporize. Electrically conductive electrodes sealed within the laser tubes generate an arc therebetween from the application of a suitable source of electrical energy to the external terminals leading from the electrodes within the tube. The tube thus energized and maintained at a suitable temperature developing sufficient vapor pressure of the metallic element causes the metal vapor to be raised to an energy level at which it will produce laser energy output.

In the prior art, metal vapor laser tubes customarily included "hot" zones, generally disposed between the electrodes which generated the electrical discharge. Moreover, the windows conventionally disposed at either end of the laser tube for transmitting the laser energy, were maintained at a significantly lower temperature; the relatively lower temperature is generally referred to as the "cold" zone. Though the windows may not actually be operated at a truly cold temperature, they were nonetheless cold relative to the hot zone. As a result, the operation of many prior art metallic vapor laser tubes was limited in life and efficiency because of the fact that the metal vapor would migrate to the cold zone on the windows and become deposited upon the windows by a partial condensation, thereby rendering the windows partially opaque to the laser energy emitted, so that the laser beam could not be efficiently transmitted outside the confines of the laser tube.

Additionally, the hot metal in its vaporous form migrated in a continuous particle flow to the cold zone, and eventually there was very little metal remaining in the hot zone where the stimulated emission laser takes place; as a result, the laser action after some determinative period of time just ceased to occur for lack of sufficient metal in the hot zone to develop sufficient vapor pressure to support and maintain lasing action.

In the prior art, in order to combat this problem many metallic vapor laser tubes introduced an inert buffer gas such as argon, for instance, or helium between the hot zone and the relatively cold zones so that the windows, for example, would be hopefully isolated from the metallic vapor and prevent the condensation of the metallic vapor upon the windows the resultant undesirable diminished efficiency of operation. Although the use of a buffer gas in prior art metallic vapor laser tubes was an advance and improvement in the art, it still left much to be desired because of several inherent disadvantages which the presence of the buffer gas introduces.

For example, the discharge within the prior art type of tube using buffer gas was always, of necessity, a mixture of the buffer gas and the vaporized metal. In certain cases where there was no interchange of energy between the two gas systems i.e., the buffer gas and the metallic vapor, the buffer gas could absorb considerable energy from the power supply. On the other hand, when there is an energy transfer between the two gas systems which is not essential for pumping energy into the metallic vapor, it is possible that such interaction with the buffer gas can inhibit the desired stimulated emission.

Moreover, even with the advantages which the use of the buffer gas provides in diminishing condensation of the metallic vapor on the cold windows, eventually all the metal may be transposed from the hot zone to the cold zone on the walls of the laser tube, for example, outside the hot zone. Consequently, after some determinable period of operation, the laser tube must be replenished with an additional amount of metal to provide the metallic vapor for the desired stimulated emission in the hot zone.

SUMMARY OF THE INVENTION

The present invention contemplates that the entire laser tube containing the metallic vapor be maintained in an elevated temperature. This may be accomplished by an appropriately configured oven, for example, to change a metallic element to its vapor state, developing an appropriate vapor pressure. Electrodes for impressing the laser excitation, in the form of an electrical potential, across the metallic vapor are connected through electrical conductors which pass through hollow capillary passages in extensions of the main enclosure of the laser tube. These extensions may be of quartz, for instance, where the main enclosure of the laser tube is also quartz, portions of the extensions adjacent the main enclosure being maintained at approximately the elevated temperatures of the main enclosure of the laser tube. The quartz extensions may preferably be fused to glass at a point more remote from the heat of the main enclosure where they are relativey cold. The glass end portions of the extensions are vacuum sealed to the electrical conductors which extend through the capillaries and connect with the electrodes for its energization by an appropriate source of electrical energy.

It has been found in the operation of the present invention that, because the entire laser tube assembly, apart from end portions of its quartz extensions, is maintained at the elevated temperature, the metallic vapor does not condense out on the windows which are usually disposed at opposite ends of a tubularly configured main enclosure of the laser tube; thus, there is no impairment of the transmission of the laser energy emission out of the laser tube, as was the case in many prior art metallic vapor laser tubes employing cold windows.

Moreover, the concept of the present invention provides a gradual change from the hot zone to the cold zone through the use of the extensions from the main enclosure, which extensions include a hollow capillary portion wherein the conductors connected to the electrodes within the tube are received and passed through into a vacuum-sealed portion of the extension to an external terminal for connection to a source of appropriate electrical energy.

In accordance with the concept of the present invention, it has been found that the metallic vapor does not migrate significantly from the hot zone because of the extremely small capillary dimensions within the extensions so that only an extremely small amount of metallic vapor condenses out, if any; if a minute amount of metallic vapor condenses out within the hollow capillary portions of the extension it has been found such condensed metal advantageously forms a seal around the electrical conductor contained within the hollow capillary which forms an operatively determined boundary between the hot and the cold zones.

Further, if quartz material is employed for the fabrication of the metallic vapor laser tube of the present invention, the main tubular portion and the windows, as well as those portions of the extensions including the hollow capillaries, may be made entirely of quartz to withstand the elevated temperatures necessary to achieve a desired stimulated laser emission.

Additionally, because of the fact that no significant amount of condensation will take place in the metallic vapor laser tube of the present invention, it is not necessary to frequently replenish the amount of metal within the tube. The highly desirable result is that the metallic vapor laser tube embodying the present invention has a significantly longer operative life than metallic vapor laser tubes of the prior art.

In an embodiment of the present invention fabricated of quartz as described hereinbefore, it has been found that a pressure-tight sealed unit can readily be achieved by fusing end portions of glass to the hollow capillary portions of the extensions from the tube; glass-to-metals seals are thus facilitated around and about the conductors extending through the glass for connection to an external source of electrical energy.

Accordingly, the primary object of the present invention is to provide a metallic vapor laser tube which, in its operation, does not incur disadvantages of prior art metallic vapor laser tubes.

Another primary object of the present invention is to provide a metallic vapor laser tube which is capable of operating with hot windows to obviate disadvantages of prior art metallic vapor laser tubes.

Another most important object of the present invention is to provide such a metallic vapor laser tube which does not require the employment of a buffer gas.

A further most important object of the present invention is to provide such a metallic vapor laser tube which minimizes the migration of the metallic vapor thus extending the operative useful life of the tube.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWINGS

In the drawings:

FIG. 1 is an isometric view of a metallic vapor laser tube embodying the present invention; and FIG. 2 is an enlarged view of a portion of the metallic vapor laser tube illustrated in FIG. 1.

DESCRIPTION OF THE PREFERRED EMBODIMENT

FIG. 1 is an isometric view of a metallic vapor laser tube embodying the present invention. An enclosure 10, which may take the elongate tubular form of the embodiment of FIG. 1, contains an amount of a metallic element such as lead, for example, or any other suitable element capable of being raised to an energy level to produce laser emission. The enclosure 10 is selected for its ability to withstand elevated temperatures of the order of as much as 900° to 1,000°C, such as high grade quartz.

The metallic vapor laser tube as conceived by the present invention also includes at least one window, such as the windows 11 and 12 illustrated, which are sealed to the ends of the enclosure 10. The windows 11 and 12 are of material selected for its capability of transmitting energy of the wavelengths of emission of the metallic element chosen for the metallic vapor laser tube and included within the enclosure 10 as explained hereinbefore. In the embodiment illustrated in FIG. 1, the windows 11 and 12 are preferably required to be optically flat for greatest efficiency of operation in transmitting laser energy.

Two electrodes 13 and 14 are disposed within the enclosure 10 at its opposite ends. The electrodes 13 and 14, of the embodiment illustrated in FIG. 1, are in cylindrical form so that the laser energy which is generated in the enclosure 10 may pass axially through their respective hollow interior axes and out the respective windows 11 and 12. The electrodes 13 and 14 each have an electrical conductor 15 and 16, respectively, arranged and connected for external connection to a suitable source of electrical energy. The electrical conductors 15 and 16 pass through respective extensions 17 and 18 from the enclosure 10 proximate to the respective electrodes 13 and 14.

Each extension, such as that shown at 17 on the left-hand side of FIG. 1, has a hollow capillary portion 19 and 20 adjacent the enclosure 10. The respective associated electrical conductors 15 and 16 pass through the hollow capillary portion 19 and 20 of the extensions 17 and 18.

The portion of the extensions 17 and 18 adjacent the enclosure 10 which include respective hollow capillary portions 19 and 20 may be fabricated of quartz of substantially the same grade and high quality as the quartz material which is suitable for the fabrication of the enclosure 10. In the preferred embodiment of the present invention the end portions 21 and 22 of the extensions 17 and 18, respectively are sealed around the respective terminal portions 23 and 24 of the electrical conductors 15 and 16 to provide a vacuum tight assembly.

A suitable high grade glass is readily adaptable to provide the end portions 21 and 22 of the extensions 17 and 18, respectively, and may be sealed to the adjacent quartz portion of each respective extension as illustrated in FIG. 1. Additionally, the glass end portions 21 and 22 may readily be fabricated to provide an excellent glass-to-metal seal with the terminal portions 23 and 24 of the conductors 15 and 16.

FIG. 2 is an enlarged portion of one end of a preferred embodiment of the present invention as illustrated in FIG. 1. Like elements as illustrated in FIG. 2 bear the same numerical designation as FIG. 1.

As previously explained, one of the primary difficulties and disadvantages of prior art metallic vapor laser tubes was that the vaporized metal tended to migrate from the hot portion of the tube, which may typically be operated at the temperature of the order of 900°C or more, to the cold portions of the tube so that some of the metallic vapor would condense out on the colder portions of the assembly. This action resulted in two principal disadvantages: one disadvantage is that the condensation of metal vapor on a cold window diminishes the efficiency of transmission of the laser energy to the outside of the tube. The present invention has overcome that problem by providing that the entire assembly, including the enclosure 10 and the windows 11 and 12, is operated at an elevated temperature so that there is a greatly diminished tendency of the metallic vapor to migrate to the windows 11 and 12 and form a condensing film of their own.

The other principal disadvantage of prior art laser tubes was that the metallic vapor would tend to migrate to other cold portions of the assembly, condensing out on the cold portions so that eventually very little of the selected metallic element in vapor form would remain to perform its lasing function. This disadvantage has been obviated in the prsent invention by providing that there be an appropriate gradual change from the hot portion of the metallic vapor laser tube, as represented by the enclosure 10 with its windows 11 and 12, to the cold portion, as represented by the terminals 23 and 24 of the electrodes 15 and 16. This is accomplished by providing that extensions, such as 17 and 18 illustrated in FIG. 2 proximate to each one of the electrodes 13 and 14, be fabricated to have hollow capillaries as illustrated at 19 and 20 in FIG. 2, through which the hot electrical conductor 15 passes.

Each of the extensions and the electrical conductor contained within it, gradually cools from its hottest point where it is connected to the electrode 13, for example, as shown in FIG. 2, to its external terminal 23 which connects to an appropriate source of electrical energy. The hollow capillary portion of 19, for example, of the extension of 17 is sufficiently small as to prevent significant migration of the metallic vapor along its path. Moreover, the electrical conductor connected to each electrode 13 and 14 as illustrated by the electrical conductor 15 of FIG. 2 gradually becomes cooler as it passes through the hollow capillary 19 and is relatively cold at the point it is enclosed in the sealed end portion 21 of the extension 17.

Moreover, it has been found that even if some very small quantity of the metallic vapor does migrate down and along the hollow capillary portions, such as illustrated in 19 in FIG. 2 of the extension 17, that minute amount of metallic vapor, upon condensation, (if it does condense and cool) will effectively seal off the hot portion of the extension 17 from its cold portion, thus actually contributing to and aiding the transition from the hot operative portion of the assembly from the cold portion of the assembly without significantly diminishing the amount or the vapor pressure of the vaporized metallic element contained within the enclosure 10.

Operation

In the practice of the present invention the metallic vapor laser tube is fabricated preferably in a configuration as illustrated in FIG. 1 and 2 and of suitable materials as previously described. With the end portions 21 and 22 of the two extensions 17 and 18 sealed to the respective electrical conductors 15 and 16 to form vacuum-tight selas, the enclosure 10 is then evacuated through an opening such as that shown at 25. The metallic element is then introduced into the interior of enclosure 10 by distillation, the metal coating the inner walls of enclosure 10. Thereafter the opening 25 is sealed off.

In operation the entire laser tube is placed within a suitable heating means, such as an oven capable of maintaining the desired temperature, and an appropriate source of electrical energy is applied to the terminals 23 and 24 of the electrical conductors 19 and 20. Upon the application of a suitable source of electrical energy, the discharge occurs between the two electrodes 13 and 14, raising the vaporized metallic element to an energized state which is sufficiently high to cause laser emission. The laser emission is transmitted through windows 11 and 12 to be employed as desired.

An embodiment of the present invention will produce laser energy for relatively long life because of the virtual elimination of migration of the metallic element from the area wherein it is vaporized and performs its lasing function. This is made possible by the concept of the present invention which provides for a hollow capillary leading through a portion of an extension from the main element enclosure 10 of the laser tube which is sufficiently large to contain an electrical conductor, but yet small enough so that no significant amount of migration of the metallic element will take place.

Furthermore, the concept of the present invention provides that the extensions from the main element of the laser tube enclosure will be such that the portion of each of the extensions, including the hollow capillary, will be hot where it joins the enclosure, but will be cold at its opposite extremity in the sense that significantly reduced temperature is maintained in that region. The temperature gradually becomes lower along each extension, diminishing from the elevated temperature of the hot portion attached to the enclosure, to the cold portion which provides the external terminal connection for the electrical conductors.

Additionally, the concept of the present invention, particularly with respect to the configuration and fabrication of the extensions from the enclosure makes possible a reliable, vacuum tight seal, preferably made to a high grade glass which is fused to the ends of the quartz portion of each extension, which seals will best withstand the rigors of operation of the metallic vapor laser tube.

Obviously many modifications and variations of the present invention are possible in the light of the above teachings. It is therefore to be understood that within the scope of the appended claims the invention may be practiced otherwise than as specifically described.

What is claimed is:

1. A metal vapor laser tube comprising:
   an enclosure containing an amount of a metallic element,
   said enclosure being of an electrically non-conductive material selected for its ability to withstand elevated temperatures and having at least one window capable of transmitting energy at the wavelength of laser emission of said metallic element,
   two electrodes oppositely disposed within said enclosure;
   an electrical conductor connected to each electrode for external connection to a source of electrical energy;
   an extension from said enclosure proximate to each electrode;
   a hollow capillary portion in each said extension adjacent said enclosure for receiving said electrical conductor in spaced disposition from the inner capillary walls,
   each said hollow capillary portion being dimensioned to prevent significant migration of metallic vapor therein; and,
   an end portion of each said extension sealed around the terminal of said electrical conductor.

2. A metal vapor laser tube as claimed in claim 1 wherein said enclosure is fabricated of quartz.

3. A metal vapor laser tube as claimed in claim 1 wherein said enclosure is tubular in shape.

4. A metal vapor laser tube as claimed in claim 3 and including an optically flat window sealed to each end of said enclosure.

5. A metal vapor laser tube as claimed in claim 4 wherein said electrodes are cylindrically shaped and axially aligned with the central axis of the tubular configuration of said enclosure.

6. A metal vapor laser tube as claimed in claim 1 wherein said extensions containing said hollow capillary portions are quartz and said end portions are glass sealed to said quartz and around the terminals of said electrical conductors.

* * * * *